(12) United States Patent
Worrall

(10) Patent No.: US 9,173,142 B2
(45) Date of Patent: Oct. 27, 2015

(54) CELLULAR COMMUNICATION SYSTEM, APPARATUS AND METHOD FOR HANDOVER

(75) Inventor: Chandrika K. Worrall, Newbury (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/281,799

(22) Filed: Oct. 26, 2011

(65) Prior Publication Data

US 2012/0040679 A1 Feb. 16, 2012

Related U.S. Application Data

(63) Continuation of application No. 11/821,580, filed on Jun. 21, 2007.

(51) Int. Cl.
*H04W 36/30* (2009.01)
*H04W 36/02* (2009.01)

(52) U.S. Cl.
CPC .............. *H04W 36/02* (2013.01); *H04W 36/30* (2013.01)

(58) Field of Classification Search
CPC .................... H04W 36/0011; H04W 36/0055; H04W 36/02; H04W 36/08; H04W 40/36
USPC ............................ 455/436–444; 370/331–334
See application file for complete search history.

(56) References Cited

U.S. PATENT DOCUMENTS

| | | | | |
|---|---|---|---|---|
| 6,473,411 | B1 * | 10/2002 | Kumaki et al. | 370/331 |
| 6,985,463 | B1 * | 1/2006 | Wright et al. | 370/331 |
| 7,440,757 | B2 * | 10/2008 | Kwon et al. | 455/436 |
| 2005/0101328 | A1 * | 5/2005 | Son et al. | 455/436 |

(Continued)

FOREIGN PATENT DOCUMENTS

| | | |
|---|---|---|
| CN | 1871796 A | 11/2006 |
| CN | 101300753 A | 11/2008 |

(Continued)

OTHER PUBLICATIONS

3GPP TR25.813, V7.0.0 (Jun. 2006), 3rd Generation Partnership Project; Technical Specification Group Radio Access Network; Evolved Universal Terrestrial Radio Access (E-UTRA) and Evolved Universal Terrestrial Radio Access Network (E-ETRAN); Radio interface protocol aspects (Release 7), (pp. 28-29).*

(Continued)

*Primary Examiner* — Matthew Sams
(74) *Attorney, Agent, or Firm* — Oblon, McClelland, Maier & Neustadt, L.L.P.

(57) ABSTRACT

A method for handover of a wireless subscriber communication unit from a first base station to a second base station in a wireless network is described. The method comprises at the wireless subscriber communication unit receiving a handover command message from the first base station. At the first base station, the method comprises sending a scheduling request message to the second base station, in response to an acknowledgement message sent from the wireless subscriber communication unit. The method further comprises, at the second base station, scheduling, in response to the scheduling request message, at least one uplink scheduling resource (UL-SCH) for the wireless subscriber communication unit to transmit a handover (HO) confirmation message to the second base station; and receiving a handover confirmation message from the wireless subscriber communication unit on the at least one uplink scheduling resource (UL-SCH).

19 Claims, 7 Drawing Sheets

(56) References Cited

U.S. PATENT DOCUMENTS

| | | | |
|---|---|---|---|
| 2006/0171358 A1* | 8/2006 | Kangas et al. | 370/331 |
| 2007/0047493 A1* | 3/2007 | Park et al. | 370/331 |
| 2007/0149206 A1* | 6/2007 | Wang et al. | 455/450 |
| 2008/0019320 A1 | 1/2008 | Phan et al. | |
| 2008/0130585 A1* | 6/2008 | Park et al. | 370/332 |
| 2008/0232323 A1* | 9/2008 | Jeong et al. | 370/331 |
| 2008/0261599 A1* | 10/2008 | Mohanty et al. | 455/436 |
| 2008/0268833 A1* | 10/2008 | Huang et al. | 455/425 |
| 2010/0202402 A1* | 8/2010 | Dalsgaard et al. | 370/331 |

FOREIGN PATENT DOCUMENTS

| | | | | |
|---|---|---|---|---|
| EP | 1973367 A2 * | 9/2008 | | H04W 72/04 |
| JP | 2003-514443 A | 4/2003 | | |
| JP | 2007-104344 A | 4/2007 | | |
| JP | 2009-510887 A | 3/2009 | | |
| JP | 2009-513086 A | 3/2009 | | |
| WO | WO 0135586 A1 * | 5/2001 | | |
| WO | WO 2005/046090 A1 | 5/2005 | | |
| WO | 2006/061184 | 6/2006 | | |
| WO | 2007/052922 | 5/2007 | | |
| WO | WO 2007/066882 A1 | 6/2007 | | |

OTHER PUBLICATIONS

Motorola, Contention and Contention-free Intra-LTE Handovers, Jan. 15-19, 2007, 3GPP TSG-RAN WG2#56bis, R2070214, pp. 1-3.*

Motorola, Synchronized Random Access Channel and Scheduling Request, Nov. 6-10, 2006, 3GPP TSG RAN1#47, R1-063046, pp. 1-3.*

U.S. Appl. No. 60/831,858 Provision Specification for U.S. Appl. No. 11/879,302, 12 page.

"$3^{rd}$ Generation Partnership Project; Technical Specification Group Radio Access Network; Physical Channels and Modulation (Release 8)," (May 2007). 3GPP: Valbonne, France, TS 36.211 v1.1.0:1-34.

3GPP Support Team. (Jun. 25-29, 2007). "Draft1 Minutes of the $58^{th}$ TSG-RAN WG2 Meeting (Kobe, Japan, May 7-11, 2007), "TSG-RAN WG2 Meeting #58bis, R2-072847, pp. 1-132.

Holma, H. et al. eds. (2001). *WCDMA for UMTS: Radio Access for Third Generation Mobile Communications*. John Wiley & Sons Ltd.: West Sussex, England, 10 pages (Table of Contents).

Motorola. (Jan. 15-19, 2007). "Contention and Contention-Free Intra-LTE Handovers," 3GPP TSG-RAN WG2 #56bis, R2-070214, Sorrento, Italy, pp. 1-3.

Samsung. (Jan. 15-19, 2007). "LTE Cell Load/RACH Load Estimations, "3GPP TSG-RAN3 Meeting #56bis, R2-070205, Sorrento, Italy, pp. 1-7.

Combined Chinese Office Action and Search Report issued Dec. 5, 2012 in Chinese Patent Application No. 200880100888.9 (English translation only).

Office Action issued Sep. 24, 2013 in Japanese Application No. 2012-257802.

Office Action issued Sep. 25, 2012, in Japanese Patent Application No. 2010-512623 (w/ English Summary).

"R2-070214:Contention and Contention-free Intra-LTE Handovers", Motorola, 3GPP TSG-RAN WG2 #56bis, pp. 1-3.

Office Action issued Jun. 3, 2014, in People's Republic of China Application No. 201210252026.6 (with English-language translation).

* cited by examiner

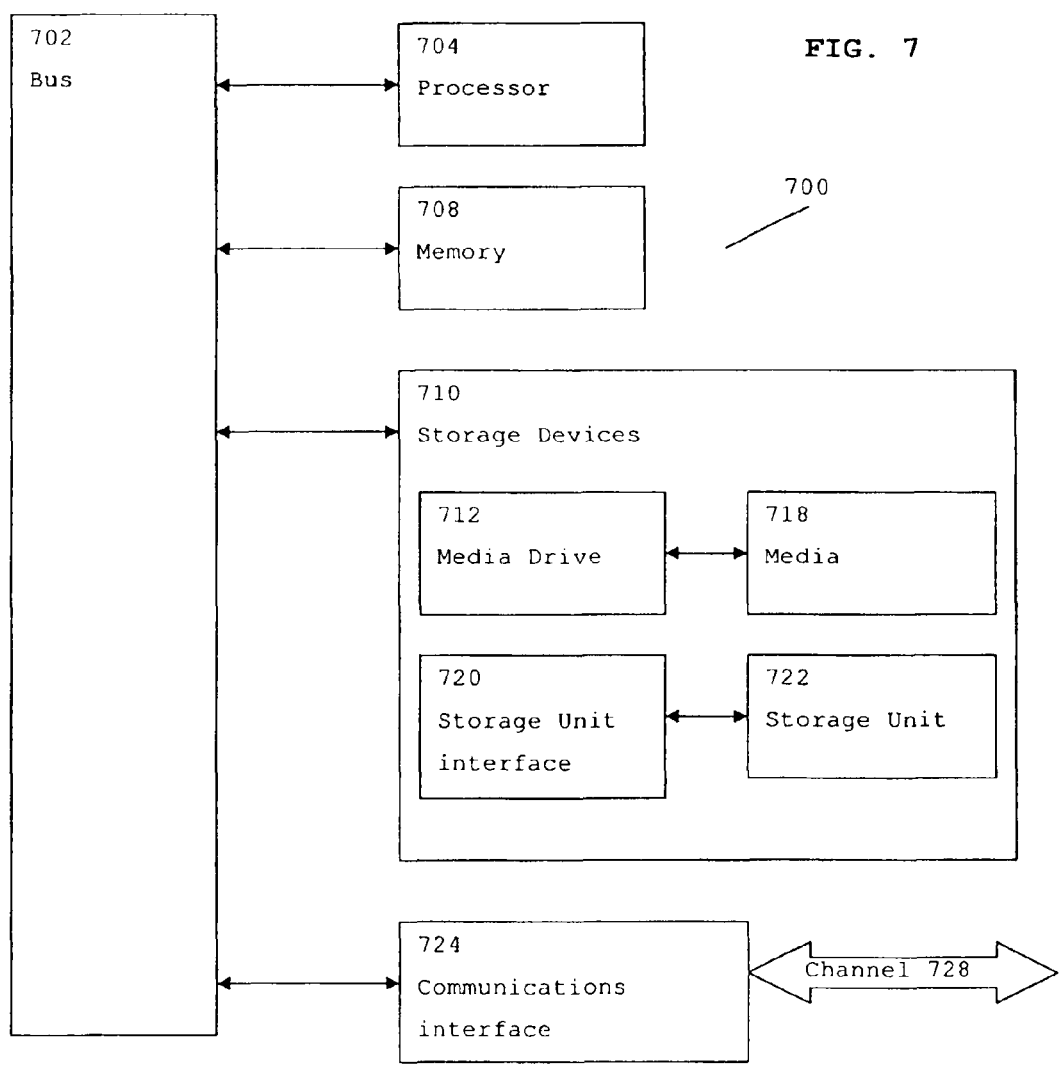

CELLULAR COMMUNICATION SYSTEM, APPARATUS AND METHOD FOR HANDOVER

CROSS-REFERENCE TO RELATED APPLICATIONS

This application is a continuation of U.S. application Ser. No. 11/821,580, filed Jun. 21, 2007. The contents of that application are incorporated herein by reference in their entirety.

FIELD OF THE INVENTION

The field of the invention relates to utilisation of communication resources in cellular communication systems and in particular, but not exclusively, to synchronized handover in a cellular communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users.

In addition, TDD provides for the same carrier frequency to be used for both uplink transmissions, i.e. transmissions from the mobile wireless communication unit (often referred to as wireless subscriber communication unit) to the communication infrastructure via a wireless serving base station and downlink transmissions, i.e. transmissions from the communication infrastructure to the mobile wireless communication unit via a serving base station. In TDD, the carrier frequency is subdivided in the time domain into a series of timeslots. The single carrier frequency is assigned to uplink transmissions during some timeslots and to downlink transmissions during other timeslots. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

Referring now to FIG. 1, a message sequence chart 100 of an Intra-LTE handover procedure in asynchronous network is illustrated, as agreed in R2-072847, 'Draft1 minutes' of the 58th TSG-RAN WG2 meeting, Kobe, Japan, 7-11 May 2007. The approach agreed at RAN2#58 describes communications between a user equipment (UE) 110, a source eNodeB 115 and a target eNodeB 120. The approach facilitates UE access to a target cell using a contention-free procedure with dedicated resources. According to the agreed procedure, the UE performs signal quality measurements and transmits these measurements, in message 130, to the source eNodeB 115. The source eNodeB 115 then initiates a handover (HO) process 135 and transmits a HO request message 140 to the target eNodeB 120 (over the UE radio access network (RAN)).

The target eNodeB 120 performs admission control 145 and allocates a dedicated preamble for RACH access in the target cell during the admission control process 145. The allocated dedicated preamble message is sent from the target eNodeB 120 to the source eNodeB 115 in a handover (HO) request acknowledge (ACK) message 150 using a new Cell specific Radio Network Temporary Identifier (C-RNTI) and thereafter to the UE 110 in a handover (HO) command message 155.

The UE 110 then transmits an acknowledge message 160 to the source eNodeB 115, which prepares the data for forwarding in both an uplink (UL) and downlink (DL) direction 165. The prepared data is then forwarded 170 from the source eNodeB 115 to the target eNodeB 120. The UE 100 is then able to perform a RACH access with the target eNodeB 120 using the allocated dedicated preamble 175, who replies with a RACH response indicating a timing advance (TA) and UL grant details 180. The UE then sends a HO confirmation message 185 to the target eNodeB 120, which replies with a further ACK message 190. Thus, this is an asynchronous handover, as the UE is not synchronized to the new cell prior to the access.

Preamble space is partitioned into two parts, namely as dedicated preambles and random preambles. For normal RACH access, UE 110 randomly selects a preamble from the random preamble portions and transmits the selected preamble over a non-synchronous RACH channel 175. Only the preambles within the random preamble portion needs to be broadcast in the cell. Dedicated preambles are always allocated to the UE 110 by the network (eNodeB). Referring now to FIG. 2, a message sequence chart 200 illustrates a case where there is no available preamble to be dedicated to the UE 210 access, or the target eNodeB 220 does not allocate a dedicated preamble for RACH access in the target cell. Here, the UE 210 accesses the target eNodeB 220 via contention-based non-synchronous RACH access, and in response thereto the target eNodeB 220 transmits a HO request ACK message 250 to the source eNodeB 215, which in turn transmits a HO command 255 to the UE 210, without carrying a dedicated preamble.

With respect to the contention aspect used in this procedure, for instance when two or more UEs have selected the same preamble, the UEs will be listening to the same RACH response 180. However, the target eNodeB 220 is only able to detect the strongest signal. Hence, the TA will be calculated for the UE with the strongest signal. In this case, all the contending UEs receive the TA and assume that it is their own TA. After performing timing alignment, the contending UEs then transmit their unique identifier on the scheduled resources. Note that, typically, more than one UE is transmitting on the same UL resources, thereby causing further collision.

However, if the eNodeB receives and decodes the signal 175 transmitted by a UE correctly, the eNodeB sends the UE's unique ID in message 180. All the contending UEs listen to the transmitted message in message 180. If the unique ID matches the UE's respective identifier (ID), that UE has successfully accessed the cell. In this case, other failed UEs re-start the RACH access by repeating the procedure from message 275 by transmitting another randomly selected preamble. If the scheduled transmission message 280 is unable to be received correctly by the target eNodeB 220, say due to the resource collision, the contention message of step 285 is not possible. In this case, the UEs re-start the RACH procedure after expiry of a timer.

Also, if the dedicated preamble (non-contention) based access fails, the UE 210 will access the target cell using a randomly selected preamble on a non-synchronous RACH channel 275. In this case, a UE 210 transmits a scheduled transmission 280 to the target eNodeB 220, who responds with contention resolution step 285, prior to the final confirmation and ACK transmissions 185, 190. Thus, the agreed asynchronous HO procedure requires the UE 110, 210 to access the new cell on a non-synchronous RACH channel. The HO load contributes significantly to the total RACH load. According to the RACH load analysis provided by Samsung™ in R2-07025, in the document titled 'LTE cell load/RACH load estimations', Samsung, RAN2#56bis, Sorrento, Italy, 15-19 Jan. 2007, 50-70% of the RACH load is caused by cell access after handover.

It is known that a reduction of RACH load in such handover procedures is always beneficial from a radio efficiency perspective.

The aforementioned known prior art deals with handover in asynchronous networks, where the DL timing is not synchronized. In contrast, in a synchronized network, the downlink (DL) transmissions are synchronized (i.e. DL frame timing occurs at the same time at different eNodeBs). However, the timing advance (TA) is a timing alignment that is needed by the UE to adjust for UL transmissions.

In synchronized handover, a UE is capable of obtaining UL synchronization to the new cell prior to the cell access in the new cell. In a synchronous network the UE is able to calculate the timing advanced based on the TA in the source cell and the time difference between the signals received from the source and the target cells. In an asynchronous network, if the time difference between the source and the target cell is given to the UE, the UE is capable of calculating the TA.

To summarize, based on a particular location of a UE and a speed of the UE, the waveforms transmitted by the UEs (UL transmission), if transmitted at the same time, will be received by the eNodeB at different times. To correct this (i.e. to ensure that the UL transmission will be received by the eNodeB in the same time slot), the eNodeB orders each UE to transmit at different times, which is referred to as Timing Advance. Thus, UL time alignment is required by the UE in both synchronized and asynchronized networks.

In normal operation, in wireless networks, the TA is calculated by the eNodeB based on the transmitted signal by the UE. The calculated TA is then sent to the UE, so that the UE is able to accordingly adjust its UL transmission timing. In synchronized networks, the TA in the target network (during a handover (HO) operation) may be calculated by the UE without any involvement of the target eNodeB. This is achieved based on a received timing difference between the signal from the source eNodeB and the target eNodeB and the current TA (known to the UE) employed in the source cell.

In an asynchronized network, this calculation is only possible if the UE is provided with the DL frame time differences between the source cell and target cell.

Thus, to clarify handover procedure in a synchronised network, the UE is able to calculate the timing advance to the new target eNodeB based on a relative time difference between the received signals from the new and old cells. This is the mechanism used in known TDD-UMTS networks. Therefore in a synchronised network it is possible to obtain synchronisation with the new cell, prior to access, and thus to avoid access in the new cell via a non-synchronous channel. A handover where the UE obtains the UL synchronisation information for the new cell, prior to cell access, is termed a 'synchronous handover'.

Referring now to FIG. 3, a message sequence chart 300 illustrates a case of a synchronous handover procedure. In an MBMS Single Frequency Network (MBSFN) operation (regardless of whether the network is time division duplex (TDD) or frequency division duplex (FDD)), the cells are DL frame synchronized.

In a synchronous network, timing advanced in the target cell can be calculated by the UE 310 simply, based on TA for the source eNodeB 315 and relative time difference between received signals from the target eNodeB 320 and source eNodeB 315. An algorithm similar to that used in the TDD-UMTS system can also be designed for the 3GPP LTE Standard. The UE 310 is able to gain UL time synchronization to the target cell prior to access, and avoid non-synchronous RACH access, and hence reduce the RACH load in the target cell.

In an asynchronous network, timing advanced in the target cell can be calculated by the UE 310 only if the DL frame differences between the source cell and the target cell are known by the UE.

One possible way of avoiding RACH access in the target cell is for the target eNodeB 320 to allocate UL signaling channel (SCH) resources with the allocation signaled via the source eNodeB 315 over the HO request ACK message 350 and the subsequent HO command 355.

The signaling flow involved in such a UE based TA calculation scheme in a wireless network is illustrated in the message sequence chart 300 of FIG. 3. Thus, after receiving the HO request 140 from the source eNodeB 315, the target eNodeB 320 allocates a C-RNTI and assigns resources on an HO request ACK UL-SCH message 350 to the source eNodeB 315. After receiving the Handover command 355, the UE 310 detaches from the existing cell and synchronizes to the new (target) cell. Then a Handover confirm message 185 is sent over the allocated UL-SCH resources.

This procedure is simple. However, the allocation of UL-SCH resources in this manner may result in a waste of radio resources. Thus, in this case, the HO command may take several hybrid automatic repeat request (HARQ) transmissions to be correctly received by the UE 310. In this manner, the UL-SCH resources may need to be reserved for the use of HO confirm message 185 for a longer duration, which is not desirable from radio efficiency perspective.

Alternatively, a start timer for the transmission of a HO confirm message 185 may be set by the target eNodeB 320. In this case, the start time should be set taking into account a worst case delay over an .times.2 interface, which is the interface between two eNodeBs, and maximum HARQ transmission delay. Thus, the HO interruption time 395 may be un-necessarily large for some transmissions.

A yet further method for synchronous HO procedure in wireless networks, which has been proposed by Motorola™ in R2-070214 in a document titled 'Contention and contention-free intra-LTE handovers' is illustrated in the message sequence chart 400 shown in FIG. 4.

Here, after receiving the HO request 140 from the source eNodeB 415, the target eNodeB 420 allocates a C-RNTI and assigns dedicated resources for CQI reporting and scheduling request channels in a HO request ACK message 450. The target eNodeB 420 conveys this information to the UE 410 via the source eNodeB 415 in HO command message 455.

After synchronizing to the target eNodeB 420, the UE 410 accesses the target cell by sending a CQI report 475 or scheduling request (SR) message on the allocated dedicated resources. The target eNodeB 420 thus allocates dedicated resources to the UE 410 in a layer-1/layer-2 control channel (UL grant) message 480.

Similar to the procedure shown in FIG. 3, the message sequence chart 400 of FIG. 4 also relies on UE communication on dedicated resources in the target cell. However, as shown, CQI/SR resources 450, 455 are used in FIG. 4 instead of UL-SCH resources 350, 355 in FIG. 3.

Thus, CQI/SR resource space can be visualized as code and time space, where CQI/SR reporting may also be either periodic or triggered. In a case of periodic reporting, a UE 410 will be allocated code and time resources in a periodic pattern. From a perspective of the UE 410, the allocated CQI/SR channel is dedicated to the UE 410 at a given time, hence allowing contention-free CQI reporting and scheduling request.

CQI reporting assists the link adaptation on DL transmission. Hence, the CQI reporting is only useful for UEs in active transmission. The UE 410 is able to be categorized into two modes depending on their activity level in LTE_Connected states. If the UE 410 is in an RRC_Connected state, and it is actively involved in the communication, the UE 410 is considered to be in a short_DRX or continuous state. For UEs that are RRC_connected, but not actively involved in a communication, the states are considered as long_DRX states.

In practice, there are a huge number (several thousands) of UEs in long_DRX state, whilst only about 200-400 UEs may be in short_DRX or continuous reception mode. Thus, in practice, the proposed approach in FIG. 4 is inefficient in allocating a dedicated CQI/SR channel for UEs operating in long_DRX state. Furthermore, the allocation of CQI channel resources may also show some level of radio resource wastage, due to the large message length used in the HO command.

Furthermore, allocation of dedicated CQI/SR resources in advance may also result in a waste of radio resources, in case the UE 410 takes long time to access the new (target) cell.

Thus, current handover techniques, particularly those suggested for synchronous handover in wireless networks are suboptimal. Hence, an improved mechanism to address the problem of synchronous handover in a wireless networks would be advantageous; particularly one that reduces or removes RACH load.

SUMMARY OF THE INVENTION

Accordingly, the invention seeks to mitigate, alleviate or eliminate one or more of the abovementioned disadvantages singly or in any combination.

According to a first aspect of the invention, there is provided a method for handover of a wireless subscriber communication unit from a first base station to a second base station in a wireless network. The method comprises, at the first base station, receiving an acknowledgement message from the wireless subscriber communication unit that it is to be handed over to the second base station; and sending a scheduling request message to the second base station, in response to the acknowledgement message to request a channel for a subsequent handover confirmation message to be sent from the wireless subscriber communication unit.

In one embodiment of the invention, employing the inventive concept avoids a need to rely on RACH or dedicated resources for HO access, by solely informing the UE of the control channel, which may be a L1/L2 control channel, in an UL grant message, without requiring UE access over a dedicated channel.

According to an optional feature of the invention, the sending of a scheduling request message may be sent prior to data forwarding of data packets from the first base station to the second base station. In this manner, the preparation of data for forwarding does not need to be completed prior to the transmission of the scheduling request message. Hence the latency incurred due to the data processing may be reduced.

According to an optional feature of the invention, the sending of a scheduling request message may be sent combined with a data forwarding of data packets from the first base station to the second base station. In this manner, the latency incurred due to the data processing may be reduced.

According to an optional feature of the invention, the handover command message may comprise an identifier (C-RNTI) for the wireless subscriber communication unit to use in a communication cell supported by the second base station. In this manner, the UE can be identified with the allocated C-RNTI unambiguously in the second base station.

In one embodiment of the invention an acceptable interruption time for a handover procedure is provided.

The invention may allow improved use of the communication resource in the communication system, for example by performing a smoother and/or more reliable synchronous handover procedure in a wireless network. The invention may allow improved performance as perceived by the end-users, for example by performing a smoother and/or more reliable synchronous handover procedure in a wireless network. The invention may provide increased throughput rates, for example, following a smoother and/or more reliable synchronous handover procedure in a wireless network.

According to an optional feature of the invention, the inventive concept may be applied to a synchronous network, where a wireless subscriber communication unit is capable of obtaining UL synchronization to a new cell prior to cell access in the new cell. In such a synchronous network the wireless subscriber communication is unit may be able to calculate a timing advanced (TA) based on the TA in the source cell and the time difference between the signals received from the source and the target cells.

According to an optional feature of the invention, the inventive concept may be applied to an asynchronous network, if the time difference between the source and the target cell is provided to the wireless subscriber communication unit, and the wireless subscriber communication unit is capable of calculating the TA.

The invention may allow a cellular communication system to perform handover more efficiently. The invention may be compatible with some existing communication systems, such as a $3^{rd}$ Generation Partnership Project (3GPP) cellular communication system or a long-term evolution 3GPP cellular communication system.

According to a second aspect of the invention, there is provided a method for handover of a wireless subscriber communication unit from a first base station to a second base station in a wireless network. The method comprises, at the second base station, receiving from the first base station, a scheduling request message to request a channel for a subsequent handover confirmation message to be sent from the wireless subscriber communication unit; and scheduling, in response to the scheduling request message, at least one uplink scheduling resource (UL-SCH) for the wireless subscriber communication unit to transmit a handover (HO) confirmation message to the second base station.

According to an optional feature of the invention, the method may further comprise transmitting a control channel message to the wireless subscriber communication unit to inform the wireless subscriber communication unit of the at least one uplink scheduling resource (UL-SCH) In this manner, the control channel, for example a L1/L2 control channel, may be used to allocate shared channel (UL-SCH) resources to a UE for a given (short) duration, which only typically adds a 1 msec. delay in a synchronous handover procedure in a wireless network.

Advantageously, use of L1/L2 controls channels ensures that the resources are monitored by all the UEs.

According to an optional feature of the invention, the method may further comprise receiving a handover confirmation message from the wireless subscriber communication unit on the at least one uplink scheduling resource (UL-SCH). In this manner, the UL-SCH resources can be shared among a large number of UEs within a small time scale.

According to an optional feature of the invention, the receiving of a handover confirmation message may further comprise concurrently receiving channel quality information (CQI) from the wireless subscriber communication unit. In this manner, compared to the known CQI/SR based handover procedures (as illustrated in FIG. 4), all CQI/SR channels are no longer required in all cases (long_DRX state). Thus, the inventive concept prevents unnecessary channel configuration and unnecessary use of scarce CQI/SR channel resources.

According to an optional feature of the invention, the receiving of a handover confirmation message may further comprise concurrently receiving a scheduling request from the wireless subscriber communication unit.

According to an optional feature of the invention, the method may further comprise completing a HO procedure by initiating path switching of communications from the first base station to the second base station in response to receiving the handover confirmation message.

According to a third aspect of the invention, there is provided a method for handover of a wireless subscriber communication unit from a first base station to a second base station in a wireless network. The method comprises, at the wireless subscriber communication unit, receiving a handover command message from the first base station and receiving at least one uplink scheduling resource (UL-SCH) on a control channel for communicating with the second base station. The method further comprises transmitting a handover confirmation message to the second base station on the at least one uplink scheduling resource (UL-SCH); and transmitting uplink data to the second base station in a cell supported by the second base station.

According to an optional feature of the invention, the method further comprises calculating a timing advance for communication in the cell supported by the second base station using properties of a synchronous network. In this manner, the UE is UL synchronized to the second base station prior to the access, hence avoiding the access over a non-synchronous RACH channel.

According to a fourth aspect of the invention, there is provided a base station capable of handover of a wireless subscriber communication unit to a second base station in a wireless network. The base station comprises logic for receiving an acknowledgement message from the wireless subscriber communication unit that it is to be handed over to the second base station. The base station further comprises logic for sending a scheduling request message to the second base station, in response to the acknowledgement message to request a channel for a subsequent handover confirmation message from the wireless subscriber communication unit.

According to a fifth aspect of the invention, there is provided a base station capable of receiving a communication handover of a wireless subscriber communication unit from a first base station in a wireless network. The base station comprises logic for receiving from the first base station, a scheduling request message to request a channel for a subsequent handover confirmation message to be sent from the wireless subscriber communication unit. The base station further comprises logic for scheduling, in response to the scheduling request message, at least one uplink scheduling resource (UL-SCH) for the wireless subscriber communication unit to transmit a handover (HO) confirmation message to the base station.

According to a sixth aspect of the invention, there is provided a wireless subscriber communication unit capable of handover from a first base station to a second base station in a wireless network. The wireless subscriber communication unit comprises logic for receiving a handover command message from the first base station; logic for receiving at least one uplink scheduling resource (UL-SCH) on a control channel for communicating with the second base station; logic for transmitting a handover confirmation message to the second base station on the at least one uplink scheduling resource (UL-SCH); and logic for transmitting uplink data to the second base station in a cell supported by the second base station.

According to a seventh aspect of the invention, there is provided logic for handover of a wireless subscriber communication unit from a first base station to a second base station in a wireless network. The logic comprises executable program code, the program code operable for receiving an acknowledgement message from the wireless subscriber communication unit that it is to be handed over to the second base station; and sending a scheduling request message to the second base station, in response to the acknowledgement message to request a channel for a subsequent handover confirmation message to be sent from the wireless subscriber communication unit.

According to an eighth aspect of the invention, there is provided logic for handover of a wireless subscriber communication unit from a first base station to a second base station in a wireless network. The logic comprises executable program code, the program code operable for receiving from the first base station, a scheduling request message to request a channel for a subsequent handover confirmation message from the wireless subscriber communication unit; and scheduling, in response to the scheduling request message, at least one uplink scheduling resource (UL-SCH) for the wireless subscriber communication unit to transmit a handover (HO) confirmation message to the second base station.

According to a ninth aspect of the invention, there is provided logic for handover of a wireless subscriber communication unit from a first base station to a second base station in a wireless network. The logic comprises executable program code, the program code operable for: receiving a handover command message from the first base station; receiving at least one uplink scheduling resource (UL-SCH) on a control channel for communicating with the second base station; transmitting a handover confirmation message to the second base station on the at least one uplink scheduling resource (UL-SCH); and transmitting uplink data to the second base station in a cell supported by the second base station.

According to a tenth aspect of the invention, there is provided a cellular communication system comprising a base station capable of handover of a wireless subscriber communication unit to a second base station in a wireless network. The base station comprises logic for receiving an acknowledgement message from the wireless subscriber communication unit that it is to be handed over to the second base station; and logic for sending a scheduling request message to the second base station, in response to the acknowledgement message to request a channel for a subsequent handover confirmation message to be sent from the wireless subscriber communication unit.

According to an eleventh aspect of the invention, there is provided a cellular communication system comprising a base station capable of handover of a wireless subscriber communication unit to a second base station in a wireless network. The base station comprises logic for receiving from the first base station, a scheduling request message to request a channel for a subsequent handover confirmation message to be sent from the wireless subscriber communication unit; and logic for scheduling, in response to the scheduling request message, at least one uplink scheduling resource (UL-SCH) for the wireless subscriber communication unit to transmit a handover (HO) confirmation message to the base station.

According to a twelfth aspect of the invention, there is provided a cellular communication system comprising a base station capable of handover of a wireless subscriber communication unit to a second base station in a wireless network. The wireless subscriber communication unit comprises logic for receiving a handover command message from the first base station; logic for receiving at least one uplink scheduling resource (UL-SCH) on a control channel for communicating with the second base station; logic for transmitting a handover confirmation message to the second base station on the at least one uplink scheduling resource (UL-SCH); and logic for transmitting uplink data to the second base station in a cell supported by the second base station.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which:

FIG. 7 illustrates a typical computing system that may be employed to implement processing functionality in embodiments of the invention.

DETAILED DESCRIPTION OF EMBODIMENTS OF THE INVENTION

The following description focuses on embodiments of the invention applicable to a Evolved-UMTS (Universal Mobile Telecommunication System) cellular communication system and in particular to a Evolved-UTRAN (UMTS Terrestrial Radio Access Network (UTRAN)) operating in a Time Division Duplex (TDD) mode within a $3^{rd}$ generation partnership project (3GPP) system. However, it will be appreciated that the invention is not limited to this particular cellular communication system, but may be applied to other cellular communication systems.

Figure 5:
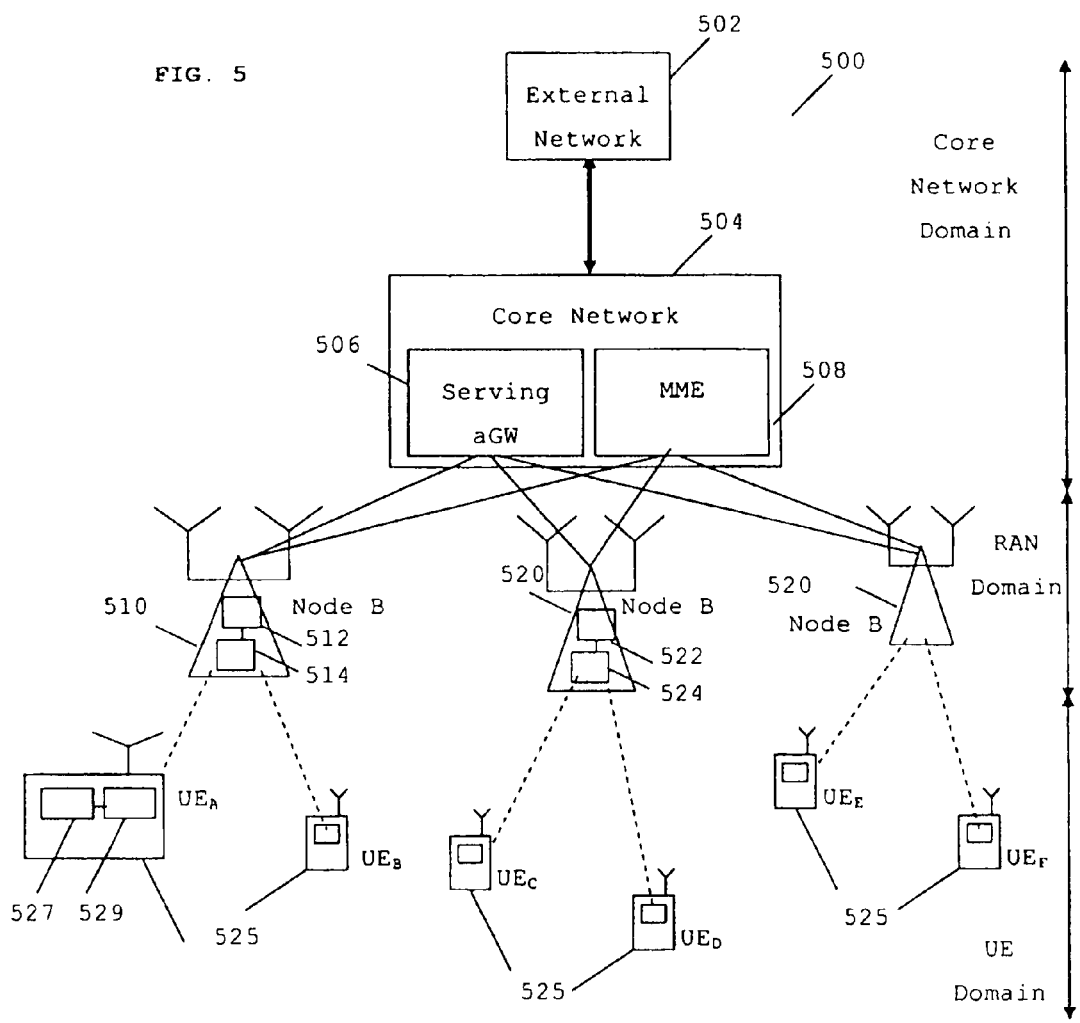
FIG. 5 illustrates an overview of some elements of a wireless communication system adapted in accordance with some embodiments of the invention.

Referring now to FIG. 5, a wireless communication system 500 is shown in outline, in accordance with one embodiment of the invention. In this embodiment, the wireless communication system 500 is compliant with, and contains network elements capable of operating over, a universal mobile telecommunication system (UMTS) air-interface. In particular, the embodiment relates to a systems architecture for an Evolved-UTRAN (E-UTRAN) wireless communication system, which is currently under discussion in 3GPP. This is also referred to as Long Term Evolution (LTE).

The architecture consists of radio access network (RAN) and core network (CN) elements, with the core network 504 being coupled to external networks 502, such as the Internet or the public switched telephone network. The main component of the RAN is an eNodeB (an evolved NodeB) 510, 520, which is connected to the CN 504 via Si interface and to the UEs 520 via an Uu interface. The eNodeB 510, 520 controls and manages the radio resource related functions. The series of Node Bs 510, 520 typically perform lower layer processing for the network, performing such functions as Medium Access Control (MAC), formatting blocks of data for transmission and physically transmitting transport blocks to UEs 525.

The CN 504 has two main components: serving aGW (serving access gateway) 506 and MME (mobility management entity) 508. The serving-aGW 506 controls the U-plane (user-plane) communication, where the management of traffic delivery is managed by the serving-aGW for RRC_Connected users. The MME 508 controls the c-plane (control plane) communication, where the user mobility, bearer establishment, and QoS support are handled by the MME 508.

E-UTRAN RAN is based on OFDMA (orthogonal frequency division multiple access) in downlink (DL) and SC-FDMA (single carrier frequency division multiple access) in uplink (UL). the further information of radio frame formats and physical layer configuration used in E-UTRAN can be found in TS 36.211 (3GPP TS 36.211 v.1.1.1 (May 2007), "3GPP Technical specification group radio access network, physical channels and modulation (release 8).

The Node Bs 510 are connected wirelessly to the UEs 525. Each Node-B contains one or more transceiver units 512, 522 operably coupled to respective signal processing logic 514, 524. Similarly, each of the UEs comprise transceiver unit 527 operably coupled to signal processing logic 529 (with one UE illustrated in such detail for clarity purposes only) and communicate with the Node B supporting communication in their respective location area.

The system comprises many other UEs and Node-Bs, which for clarity purposes are not shown.

Figure 6:
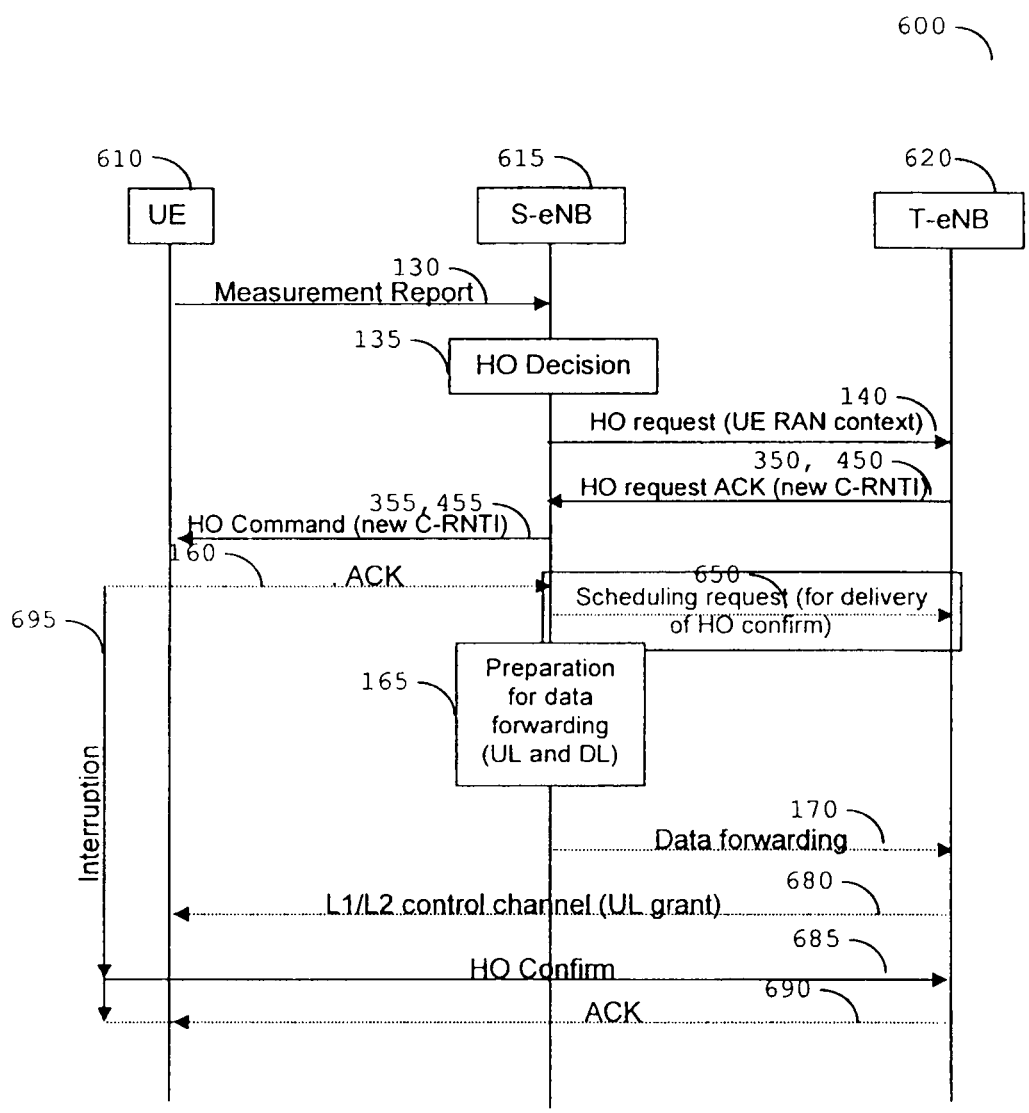
FIG. 6 illustrates a message sequence chart of an intra-LTE synchronous handover procedure in a wireless network in accordance with some embodiments of the invention.

In accordance with one embodiment of the invention, the UE 525, and in particular the operation of the transceiver units 527 and signal processing logic 529 has been adapted to receive a control channel message, for example a L1/L2 control channel message from a target eNodeB supporting communication in a cell that the UE is moving to, as described in further detail with respect to FIG. 6. The UE 525, and in particular the operation of the transceiver units 527 and signal processing logic 529 has been further adapted to respond to the L1/L2 control channel message with a handover confirmation message sent to the target eNodeB (via a source (serving) eNodeB) on the allocated UL granted channel, as described in further detail with respect to FIG. 6.

In accordance with one embodiment of the invention, a base station, such as a source eNode-B 510, and in particular the operation of the transceiver unit 512 and signal processing logic 514 has been adapted to transmit a scheduling request message 605 from a communication cell that the UE 525 is located in, to a communication cell that the UE 525 is moving to, as described in further detail with respect to FIG. 6.

In accordance with one embodiment of the invention, a base station, such as a target eNode-B 520, and in particular the operation of the transceiver unit 522 and signal processing logic 524 has been adapted to receive a scheduling request message from a source eNodeB and, in response thereto, transmit a L1/L2 control channel message from a communication cell that the UE is moving to, to the UE 525, as described in further detail with respect to FIG. 6. The target eNode-B 520, and in particular the operation of the transceiver unit 522 and signal processing logic 524 has been further adapted to recognize a HO confirmation message sent from the UE on the UL channel allocated in the L1/L2 control channel message and transmit an ACK message to the UE 525 in response thereto, as described in further detail with respect to FIG. 6.

Referring now to FIG. 6, a message sequence chart 600 is illustrated, showing a handover (HO) procedure in accordance with some embodiments of the invention. The steps involved in the HO procedure in FIG. 6, in accordance with embodiments of the invention, utilize conventional operations 130, 135, 140, 350, 355, 450, 455 in the known HO procedure. After performing admission control, the target eNodeB 620 allocates C-RNTI to be used in the target cell. This information is conveyed to the UE 610 via the source eNodeB 615 over a HO request ACK message 350, 450 and a HO command message 355, 455.

After receiving a HARQ ACK for HO command 160, the source eNodeB 615 sends a scheduling request message 650 to the target eNodeB 620. It is noteworthy that message 650 is a new message, which is not seen in a conventional HO procedure. This message 650 conveys an indication that the UE 610 has correctly received the HO command 355, 455 in the source cell and that the UE 610 is ready to establish a connection to the target cell. After receiving the HO command ACK 160, the source eNodeB 615 prepares the data (UL and DL) 165 to be forwarded 170 to the target eNodeB 620. It is noteworthy, in one embodiment of the invention, that data forwarding for both UL and DL communication is per as agreed for LTE in RAN2#58.

In one embodiment of the invention, the sending of a scheduling request message may be sent combined with forwarding data from the first base station to the second base station, as compared to prior to the forwarding of data.

After receiving the scheduling request message 650, the target eNodeB 620 allocates resources to the UE 610 on UL-SCH and the scheduling grant is transmitted over the L1/L2 control channel 680 where C-RNTI in the target cell is used to identify the UE 610 in the target cell. In an alternative embodiment of the invention, message 680 may be initiated straight after scheduling request message 650. The UE 610 sends the HO confirm message 685 over the allocated UL-SCH resources.

In a yet further alternative embodiment of the invention, it is envisaged that call quality information (CQI) and/or scheduling request messages 650, if needed, may be piggy-backed to the HO confirmation message 685.

In this embodiment, CQI may be used for finding a best sub-carrier frequency for DL transmission. So, based on the CQI, the eNodeB scheduler is able to perform the link adaptation by selecting the best frequency band for the DL data transmission. In order to allow the DL link adaptation, it is envisaged that in this embodiment of the invention that CQI may be piggy-backed to the UL data payload (in this case, a HO confirm message 685). In this embodiment, a scheduling request may be used to inform the eNodeB that the UE 610 has UL data to be transmitted. If the UE 610 has UL data to be transmit at the same time that the HO confirm message is sent, it is envisaged that the scheduling request may also be piggy-backed to the UL data payload. It is noteworthy that the UE 610 cannot concurrently send UL data and CQI on a CQI/SR channel, due to the single carrier property of SC-CDMA and that CQI/SR channel resources are separated from the UL-SCH.

The single carrier property of SC-CDMA requires that the UL transmission is to be contiguous in the frequency domain. The frequency resources for CQI/SR channels are separated from the frequency resources designed for uplink shared channels (UL-SCH). Hence, the UE is not allowed to transmit on CQI/SR channel and UL-SCH simultaneously.

It is envisaged that, in some embodiments of the invention, the procedure may not rely on dedicated resources for HO access. Hence, in this embodiment of the invention, the procedure may provide a radio efficient HO procedure for synchronous networks.

According to some embodiments of the invention, for example in a case where the UE handover occurs when the UE is operating in a long_DRX state, it is envisaged that no CQI/SR channel need be established. Thus, in this embodiment of the invention, the UE may transition to a long_DRX state immediately after the handover operation has been completed. Therefore, in this regard, embodiments of the invention may result in less signaling overhead for handover of UEs in long_DRX states.

According to some embodiments of the invention, for example in a case where the UE handover occurs when the UE is operating in a short_DRX state, for example after receiving the HO confirm message 685, the target eNodeB 620 may establish the CQI/SR channel. Thus, the UE 610 operating in a short_DRX state is handled in the same manner as in a long_DRX state. After receiving a HO confirm message 685, the target eNodeB 620 configures the channels required for short_DRX operation. In this case, CQI/SR channels and also the short_DRX periods may be configured in the target eNodeB 620. The channel configuration may be set by radio resource management (RRM) logic and may be different from configurations used at the source eNodeB 615. After reception of the HO confirm message 685 the UE 610 is attached to the target eNodeB 620, and the target eNodeB 620 becomes the source eNodeB 615.

In order to better appreciate one advantage provided by some embodiments herein described, let us consider the HO interruption time, sometimes referred to as U-plane interruption time. HO interruption time comprises of four main components:

(a) Radio layer process,
(b) UL RRC signaling,
(c) DL RRC signaling, and
(d) Data forwarding delay.

Radio layer process latency may be defined as the delay between a reception of HO command by the UE 610 to the UL resource allocation provided by the target eNodeB 620. Thus, the radio layer process consists of Frequency synchronization delay, DL synchronization delay, UL resource request and timing advance acquisition delay. A skilled artisan will appreciate that frequency synchronization delay and DL synchronization delay are the same in all of the hereinbefore mentioned procedures in FIGS. 1 to 4 and FIG. 6. It can be assumed that the UE has acquired frequency synchronization and DL synchronization during the measurement period, and can therefore relate the target cell DL timing to the source cell DL timing using a timing offset. Hence, for asynchronous networks, this delay may typically be considered to be of an order of less than 1 msec.

In contrast, for synchronous networks, the DL timing in the target cell is substantially the same as the source cell DL timing. Hence, the delay effect from this component is 0 msec in synchronous networks.

With regard to the interruption time introduced by the UL resource request and timing advance (TA) acquisition delay, this interruption time depends on the respective procedure applied. In the known asynchronous networks of FIG. 1 and FIG. 2, where the TA is acquired by accessing the RACH, the delay comprises of the following:

(i) Waiting for an RACH access slot (which is typically of the order of 2.5 msec., if 5 msec. RACH intervals are assumed), (ii) Transmission of TA preamble (which is typically of the order of 1 msec.), (iii) Receiving TA and UL resource grant for a HO confirm message (which is typically of the order of 7.5 msec).

Thus, the total UL resource and TA acquisition delay is typically of the order of 11 msec. A skilled artisan will appreciate that this is a best case scenario, where no re-transmission is assumed for transmission of HO command, and no contention is assumed on RACH channel. If a re-transmission delay occurs, or a delay is introduced due to contention, the total UL resource and TA acquisition delay will be increased.

In general, a resumption of U-plane activity may be triggered by radio resource control (RRC) signaling, as would be appreciated by a skilled artisan. A reception of a HO confirm message may trigger a resumption of DL U-plane activity. A subsequent HO confirm ACK message may trigger a resumption of UL U-plane activity. As would be appreciated by a skilled artisan, the RRC signaling delay consists of radio transmission delay, processing delay and decoding delay. In an optimal scenario this may typically be of the order of 5 msec. Furthermore, if 30% HARQ transmission is assumed, the average delay may increase up to typically of the order of 6.5 msec. However, as would be appreciated by a skilled artisan, an error rate of 30% is not realistic for time critical messages. Thus, in a practical scenario, the error rate should be considered to be much lower than 30%.

Furthermore, data forwarding delay consists of eNodeB processing delay and the transmission delay over the ×2 interface. This may be assumed to be 5 msec in average.

In addition, CQI/SR channel interval may be assumed to be 5 msec. Hence, the waiting time for CQI/SR channel is 2.5 msec. The transmission and decoding of CQI/SR channel be considered as 2 msec. Delay due to the transmission and decoding of L1/L2 control channel is assumed to be of the order of 2 msec. Delay due to the transmission and decoding of ACK/NACK is assumed to be of the order of 2 msec.

Based on the delay components described above, the total interruption time in UL and DL for the different procedures may be calculated as shown in Table 1.

TABLE 1 interruption time analysis

Figure 1:
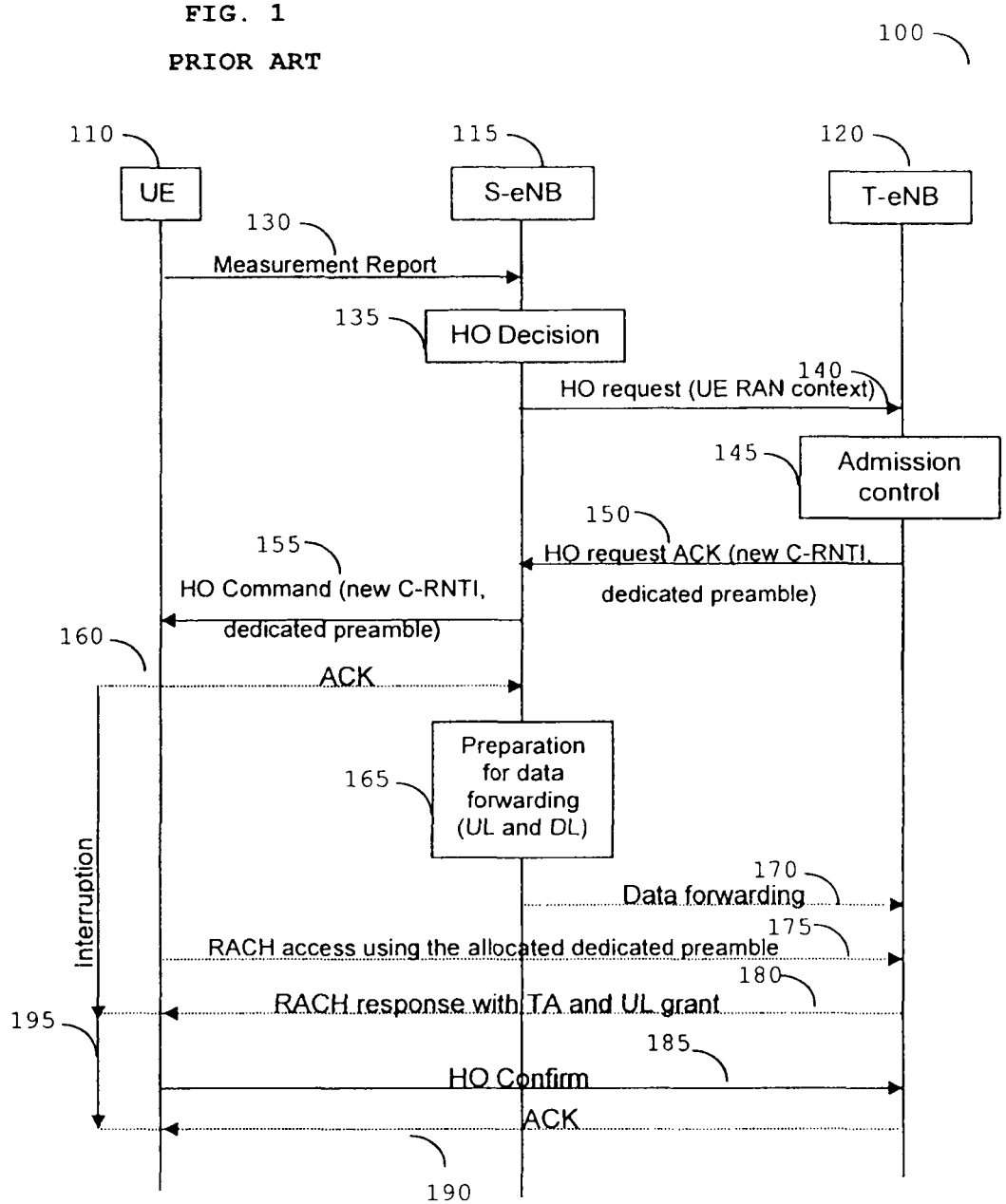
FIG. 1 illustrates a message sequence chart of an intra-LTE asynchronous handover procedure in a known wireless network.
Figure 4:
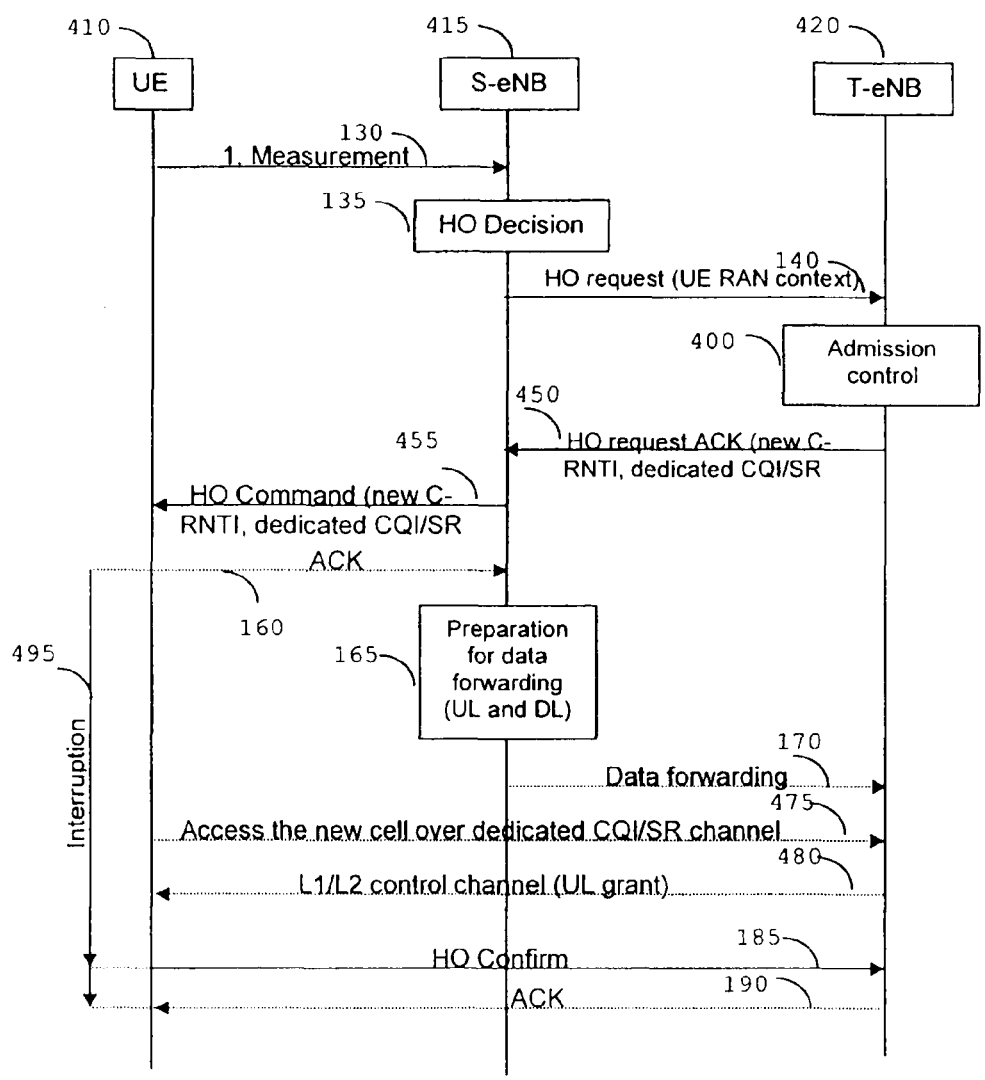
FIG. 4 illustrates a message sequence chart of an intra-LTE synchronous handover procedure in a known wireless network.

|  | Asynchronous Procedure in FIG. 1 | Synchronous Procedure in FIG. 4 | Synchronous Procedure in FIG. 6 |
|---|---|---|---|
| DL delay | 12 msec [worst case 17.5 msec] | 11.5 msec | 12 msec |
| UL delay | 12 msec | 13.5 msec | 14 msec |

TABLE 1-continued interruption time analysis

|  | Asynchronous Procedure in FIG. 1 | Synchronous Procedure in FIG. 4 | Synchronous Procedure in FIG. 6 |
|---|---|---|---|
|  | [worst case 18.5 msec] |  |  |

In the asynchronous process of FIG. 1, if the UE arrival in the target eNodeB can uniquely be identified by reception of the dedicated preamble, the HO confirm step 180 may be omitted. If this is the case, the DL and UL interruption in procedure described in FIG. 1 equals 12 msec. However, the reception of a HO confirm message is still required, and then the interruption time is 17.5 msec and 18.5 msec in DL and UL respectively.

It is noteworthy that the delay calculation in Table 1 depends on:

(i) The RACH channel configuration for the procedure of FIG. 1;

(ii) The CQI/SR channel configuration for the procedure in FIG. 4); and (iii) The transfer delay over .times.2 interface for the procedure in FIG. 6).

According to the current agreed specification in LTE, following handover of the UE to a new cell the source eNodeB forwards all DL PDCP service data units (SDUs) with their SN that have not been acknowledged by the UE to the target eNodeB. The target eNodeB then re-transmits and prioritizes all DL PDCP SDUs forwarded by the source eNodeB. In UL, upon handover the source eNodeB forwards uplink PDCP SDUs received out-of-sequence to the target eNodeB. The UE then re-transmits the UL PDCP SDUs that have not been successfully received by the source eNodeB. Thus, only the PDCP SDUs that are successfully received in-sequence are forwarded to the Serving-aGW.

Considering the above agreement, both in UL and DL, PDCP SDUs are forwarded to the target eNodeB. Re-ordering or prioritization of PDCP SDUs is, thus, performed at the target eNodeB. Therefore, the actual interruption, as seen by the application layer, depends on the forwarding delay over ×2 interface. In other words, the U-plane interruption equals a maximum of the interruption time shown in Table 1 and the data forwarding delay over ×2 interface. For example if data forwarding delay (including the preparation for forwarding) is 15 msec., the interruption time should be 15 msec. in all of the procedures shown in Table 1.

Although one embodiment of the invention describes a synchronous handover mechanism for a wireless synchronous network, such as future evolutions of UTRA 3GPP (currently referred to as 'long term evolution' (LTE)), it is envisaged that the inventive concept is not restricted to this embodiment, and may be applied to any wireless network.

It is envisaged that the aforementioned inventive concept aims to provide one or more of the following advantages:

(i) Employing the inventive concept avoids a need to rely on RACH or dedicated resources for HO access, by solely informing the UE of the L1/L2 control channel in an UL grant message.

(ii) A L1/L2 control channel may be used to allocate shared channel (UL-SCH) resources to a UE for a given (short) duration, which only typically adds a 1 msec. delay in the handover procedure in a synchronous network. This embodiment advantageously utilizes the fact that L1/L2 controls channels are monitored by all the UEs. The UE to which the resources are granted is identified by the C-RNTI, which is indicated in the L1/L2 control channel. In this manner UL-SCH resources can be shared among a large number of UEs within a small time scale.

(iii) Compared to the dedicated preamble based HO access (illustrated in FIG. 1), the inventive concept reduces the required RACH resources needed to achieve the same contention probability. In this regard, it is noteworthy that, in prior art handover procedures, '64' orthogonal RACH preambles are possible in a single RACH channel resource. This means that, if some of these preambles are reserved for dedicated, use, there is a reduced number of preambles available for random selection. Hence, the contention probability in prior art procedures increases if the RACH channel resources are kept the same. Otherwise, to keep the contention probability at an acceptable level, the resource allocated for RACH channel needs to be increased, which makes the prior art procedures inefficient.

Figure 2:
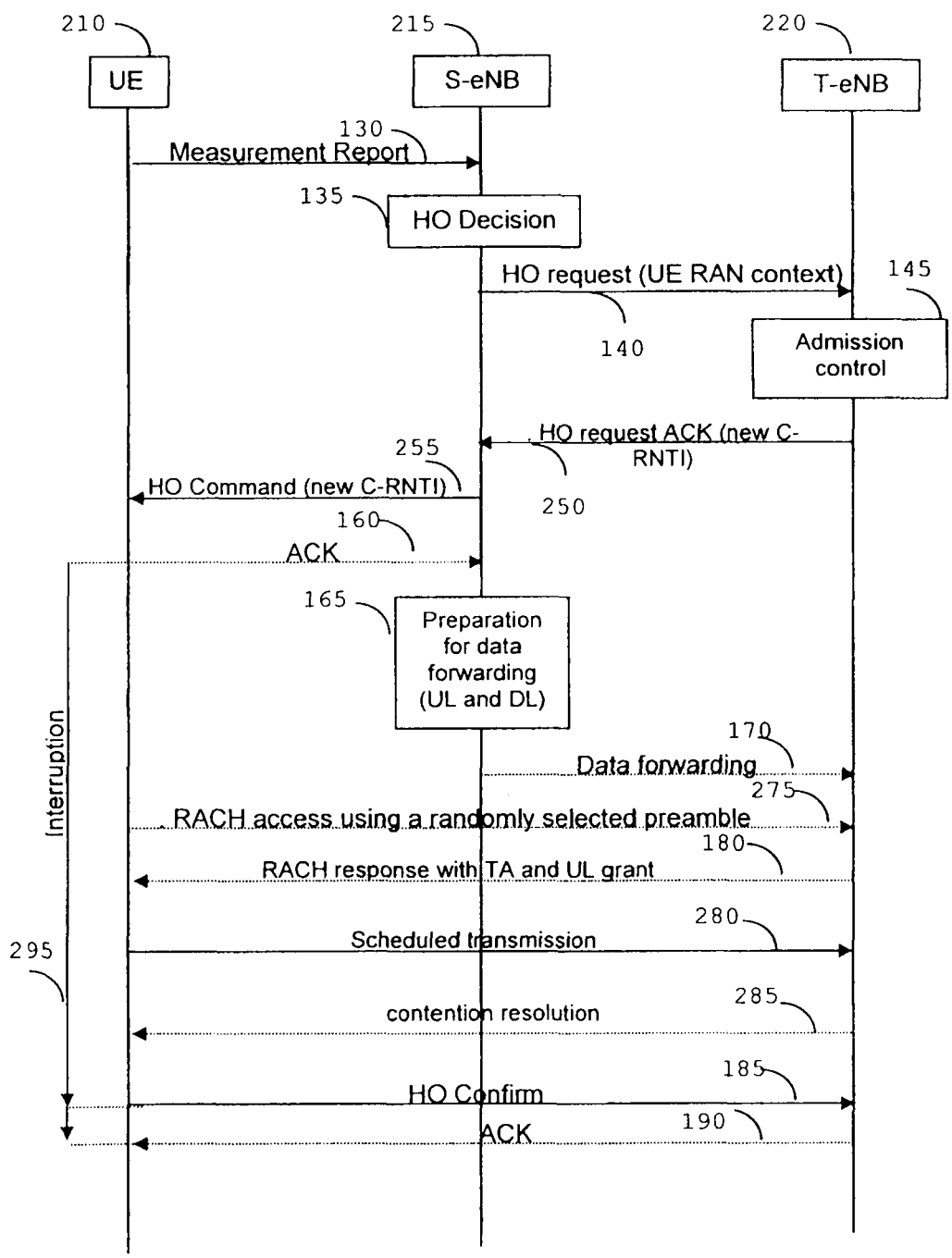
FIG. 2 illustrates a message sequence chart of an intra-LTE asynchronous handover procedure in a known wireless network.

(iv) Compared to the contention based RACH access after handover (as illustrated in FIG. 2), the HO load increases the load on RACH. The same explanation above is valid for contention probability and required RACH resources. In addition, due to the contention applied in FIG. 2, the prior art handover procedure interruption time also increases. This is because, if a collision occurs, the UE should wait and re-try the access at a later time. These disadvantages may be avoided when employing the inventive concept herein before described.

Figure 3:
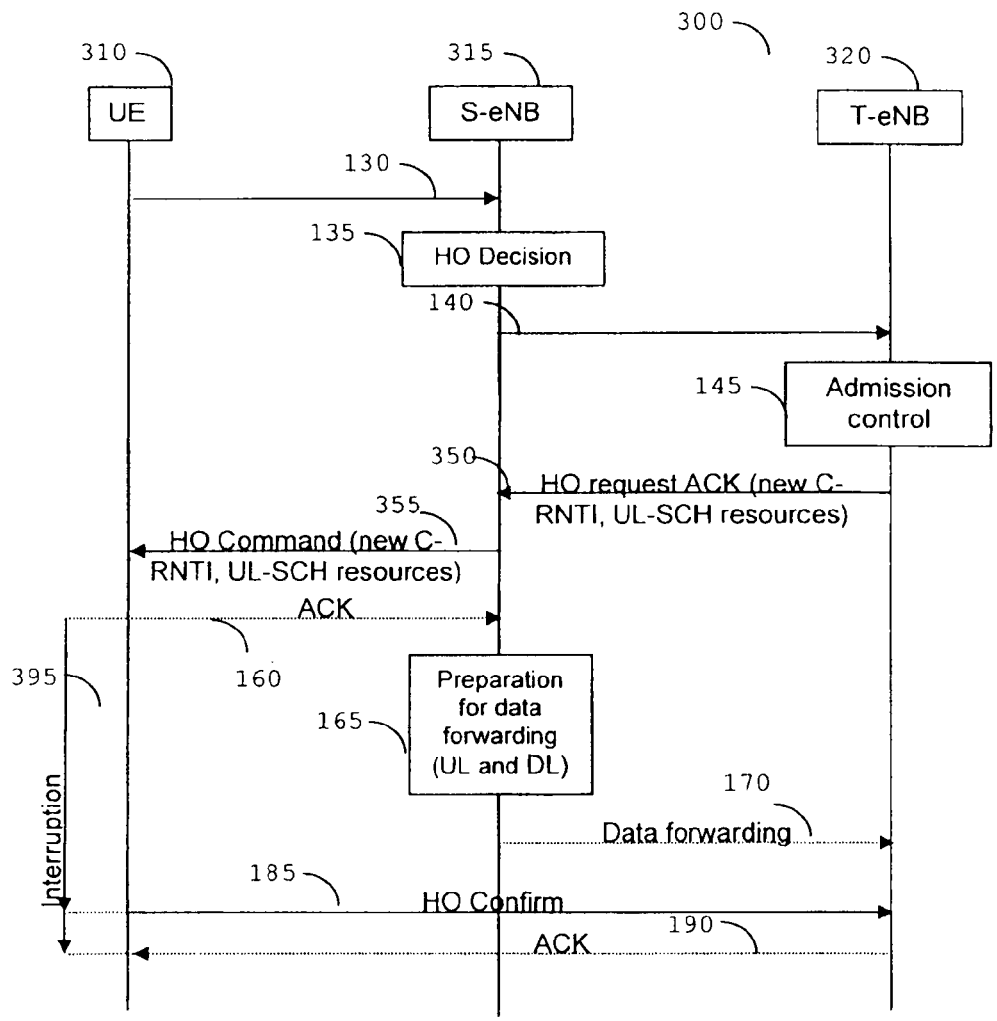
FIG. 3 illustrates a message sequence chart of an intra-LTE synchronous handover procedure in a known wireless network.

(v) Compared to the resource allocation via HO command (as illustrated in FIG. 3), the inventive concept saves the radio resources that are otherwise wasted. This is because, as the target eNodeB does not know the time of a UE arrival at the time of a resource allocation in prior art systems, the resources need to be reserved in advanced. Thus, the allocation should target the worst case UE. Therefore, the reserved resources cannot be allocated to another UE until the handover UE accesses the target eNodeB. Hence, the prior art radio resource is used inefficiently.

(vi) Compared to the CQI/SR based HO access (as illustrated in FIG. 4), all CQI/SR channels are no longer required in all cases (long_DRX state). Thus, the inventive concept prevents unnecessary channel configuration and unnecessary use of scarce CQI/SR channel resources.

(vii) Employing the inventive concept provides an acceptable interruption time.

FIG. 7 illustrates a typical computing system 700 that may be employed to implement processing functionality in embodiments of the invention. Computing systems of this type may be used in the NodeB (in particular, the scheduler of the NodeB), core network elements, such as the GGSN, and RNCs, for example. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

What is claimed is:

1. A method for handover of a wireless subscriber communication unit from a first base station to a second base station in a synchronous network, the method comprising at the wireless subscriber communication unit:
   receiving a handover command message from the first base station, the handover being from the first base station to the second base station in the synchronous network;
   receiving uplink scheduling resource (UL-SCH) information using a control channel for communicating with the second base station;
   transmitting a handover confirmation message to the second base station on the at least one uplink scheduling resource (UL-SCH) and concurrently transmitting a channel quality information (CQI) report to the second base station on the at least one uplink scheduling resource (UL-SCH); and
   transmitting uplink data to the second base station in a cell supported by the second base station.

2. The method of claim 1 wherein the handover command message comprises an identifier (C-RNTI) for the wireless subscriber communication unit to use in a communication cell supported by the second base station.

3. The method of claim 1 further comprising obtaining uplink synchronization to the communication cell supported by the second base station prior to cell access.

4. The method of claim 1 wherein transmitting a handover confirmation message further comprises concurrently transmitting a scheduling request to the second base station.

5. The method of claim 1, wherein the method is employed in a wireless network based on shared channel operation.

6. The method of claim 1, wherein the method is employed in a 3$^{rd}$ Generation Partnership Project (3GPP) cellular communication system.

7. The method of claim 6, wherein the method is employed in a long-term evolution 3GPP cellular communication system.

8. The method according to claim 1, wherein the uplink scheduling resource (UL-SCH) information is transmitted from the second base station based on information received from the first base station.

9. The method according to claim 1, wherein the step of receiving uplink scheduling resource (UL-SCH) information using the control channel for communicating with the second base station is performed after an acknowledgement is transmitted from the wireless subscriber communication unit.

10. The method according to claim 9, wherein the acknowledgement is transmitted from the wireless subscriber communication unit to the first base station and, in response, a message is transmitted to the second base station from the first base station providing confirmation of the acknowledgement.

11. A wireless subscriber communication unit capable of handover from a first base station to a second base station in a synchronous network, the wireless subscriber communication unit comprising:
   a receiver configured to receive a handover command message from the first base station, the handover being from the first base station to the second base station in the synchronous network;
   a schedule receiver configured to receive uplink scheduling resource (UL-SCH) information using a control channel for communicating with the second base station;
   a handover transmitter configured to transmit a handover confirmation message to the second base station on the at least one uplink scheduling resource (UL-SCH) and to concurrently transmit a channel quality information (CQI) report to the second base station on the at least one uplink scheduling resource (UL-SCH); and
   an uplink transmitter configured to transmit uplink data to the second base station in a cell supported by the second base station.

12. The wireless subscriber communication unit of claim 11 wherein the handover command message comprises an identifier (C-RNTI) for the wireless subscriber communication unit to use in a communication cell supported by the second base station.

13. The wireless subscriber communication unit of claim 11 further comprising a synchronization unit configured to obtain uplink synchronization to the communication cell supported by the second base station prior to cell access.

14. The wireless subscriber communication unit of claim 11 wherein the handover transmitter further concurrently transmits a scheduling request to the second base station.

15. The wireless subscriber communication unit of claim 11, wherein the base station is employed in a wireless network based on shared channel operation.

16. The wireless subscriber communication unit of claim 11, wherein the wireless subscriber communication unit is capable of communication in a $3^{rd}$ Generation Partnership Project (3GPP) cellular communication system.

17. The wireless subscriber communication unit of claim 16, wherein the wireless subscriber communication unit is capable of communication in a long-term evolution 3GPP cellular communication system.

18. A non-transitory computer readable medium encoded with a computer program for handover of a wireless subscriber communication unit from a first base station to a second base station in a synchronous network, the program, when loaded on a processor, causes the processor to execute a method comprising:
   receiving a handover command message from the first base station, the handover being from the first base station to the second base station in the synchronous network;
   receiving at least one uplink scheduling resource (UL-SCH) information using a control channel for communicating with the second base station;
   transmitting a handover confirmation message to the second base station on the at least one uplink scheduling resource (UL-SCH) and concurrently transmitting a channel quality information (CQI) report to the second base station on the at least one uplink scheduling resource (UL-SCH); and
   transmitting uplink data to the second base station in a cell supported by the second base station.

19. A cellular communication system comprising a base station capable of handover of a wireless subscriber communication unit to a second base station in a synchronous network, the wireless subscriber communication unit comprising:
   a handover command receiver configured to receive a handover command message from the first base station, the handover being from the first base station to the second base station in the synchronous network;
   an uplink receiver configured to receive uplink scheduling resource (UL-SCH) information using a control channel for communicating with the second base station;
   a handover confirmation transmitter configured to transmit a handover confirmation message to the second base station on the at least one uplink scheduling resource (UL-SCH) and to concurrently transmit a channel quality information (CQI) report to the second base station on the at least one uplink scheduling resource (UL-SCH); and
   an uplink transmitter configured to transmit uplink data to the second base station in a cell supported by the second base station.

* * * * *